(12) United States Patent
Henderson et al.

(10) Patent No.: US 6,375,722 B1
(45) Date of Patent: Apr. 23, 2002

(54) HEAT OF COMPRESSION DRYER

(75) Inventors: Charles A. Henderson, Wheaton; Terry D. Henderson, Naperville, both of IL (US)

(73) Assignee: Henderson Engineering Co., Inc., Sandwich, IL (US)

(*) Notice: Subject to any disclaimer, the term of this patent is extended or adjusted under 35 U.S.C. 154(b) by 0 days.

(21) Appl. No.: 09/643,331

(22) Filed: Aug. 22, 2000

(51) Int. Cl.[7] .................... B01D 53/04; B01D 53/26
(52) U.S. Cl. .................. 96/112; 96/115; 96/130; 96/143
(58) Field of Search .................. 95/14, 15, 18, 95/21, 117, 123–125; 96/111–115, 130, 143, 144

(56) References Cited

U.S. PATENT DOCUMENTS

| | | | |
|---|---|---|---|
| 1,831,644 A | | 11/1931 | Adair et al. |
| 2,248,225 A | * | 7/1941 | Fonda ................ 96/111 |
| 2,572,009 A | * | 10/1951 | Carson ............... 96/111 |
| 3,011,589 A | | 12/1961 | Meyer |
| 3,359,706 A | * | 12/1967 | Zankey ........... 96/112 X |
| 3,766,713 A | * | 10/1973 | Leonard .......... 96/114 X |
| 3,950,154 A | | 4/1976 | Henderson et al. |
| 4,197,095 A | * | 4/1980 | White, Jr. et al. ...... 96/112 X |
| 4,247,311 A | * | 1/1981 | Seibert et al. .......... 96/111 |
| 4,769,051 A | | 9/1988 | Defrancesco |
| 4,783,432 A | | 11/1988 | Settlemeyer |
| 4,816,043 A | * | 3/1989 | Harrison ............ 96/115 X |
| 4,832,711 A | * | 5/1989 | Christel, Jr. et al. ..... 96/112 X |
| 4,927,434 A | * | 5/1990 | Cordes et al. ......... 96/112 X |
| 4,941,894 A | * | 7/1990 | Black ................ 96/112 X |
| 4,971,610 A | * | 11/1990 | Henderson ............ 96/111 |
| 5,137,548 A | | 8/1992 | Grenier et al. |
| 5,152,812 A | | 10/1992 | Kovach |
| 5,234,479 A | | 8/1993 | Henderson et al. |
| 5,376,164 A | | 12/1994 | Zarchy et al. |
| 5,453,112 A | | 9/1995 | Sinicropi et al. |
| 5,500,035 A | | 3/1996 | Zarchy et al. |
| 5,658,369 A | | 8/1997 | Kusay |
| 5,759,236 A | | 6/1998 | Brück et al. |
| 5,989,313 A | * | 11/1999 | Mize ................ 96/112 |
| 6,171,377 B1 | | 1/2001 | Henderson |

FOREIGN PATENT DOCUMENTS

DE        3811168 A   * 10/1989          96/112

* cited by examiner

Primary Examiner—Robert H. Spitzer
(74) Attorney, Agent, or Firm—Trexler, Bushnell, Giangiorgi, Blackstone & Marr, Ltd.

(57) ABSTRACT

A system for drying a gas includes a source of gas, a compressor connected to the source, and a heat of compression dryer connected to the compressor. The dryer includes a first tower and a second tower, each tower containing desiccant material therein. Temperature monitors are provided at the inlet of the dryer and at the outlet of the towers. Temperature readings from the temperature monitors are communicated to a controller which determines a suitable mode in which the dryer is to be placed.

13 Claims, 3 Drawing Sheets

HEAT OF COMPRESSION DRYER

BACKGROUND OF THE INVENTION

This invention is generally directed to an improved heat of compression dryer which provides performance under virtually any operating condition.

Today, dryers are designed to operate at the outlet of the compressor. With a heat of compression type dryer, the discharge temperature of the air at the outlet of the compressor is a critical item that determines the efficiency of the dryer. Many compressors have low discharge temperatures and thus the dryer that regenerates at the outlet is able to provide very limited performance.

The present invention overcomes or minimizes the deficiencies of the prior art by providing a novel dryer having a controller and a communication structure which enables the dryer to be placed in predetermined modes to maximize the efficiency of the dryer. Other features and advantages will become apparent upon a reading of the attached specification, in combination with a study of the drawings.

OBJECTS AND SUMMARY OF THE INVENTION

A general object of the present invention is to provide an improved heat of compression dryer.

An object of the present invention is to provide an improved heat of compression dryer which delivers optimum performance under any set of conditions.

Another object of the present invention is to provide an improved heat of compression dryer which can operate in a "heatless" mode.

Yet a further object of the present invention is to provide an improved heat of compression dryer which can operate in a closed loop cooling mode.

Briefly, and in accordance with the foregoing, the present invention discloses a system for drying a gas. The system includes a source of gas, a compressor connected to the source, and a heat of compression dryer connected to the compressor. The dryer includes a first tower and a second tower, each tower containing desiccant material therein. Temperature monitors are provided at the inlet of the dryer and at of the outlet of the towers. Temperature readings from the temperature monitors are communicated to a controller which determines a suitable mode in which the dryer is to be placed.

BRIEF DESCRIPTION OF THE DRAWINGS

The organization and manner of the structure and operation of the invention, together with further objects and advantages thereof, may best be understood by reference to the following description, taken in connection with the accompanying drawings, wherein like reference numerals identify like elements in which.

DETAILED DESCRIPTION OF THE ILLUSTRATED EMBODIMENT

Figure 1:
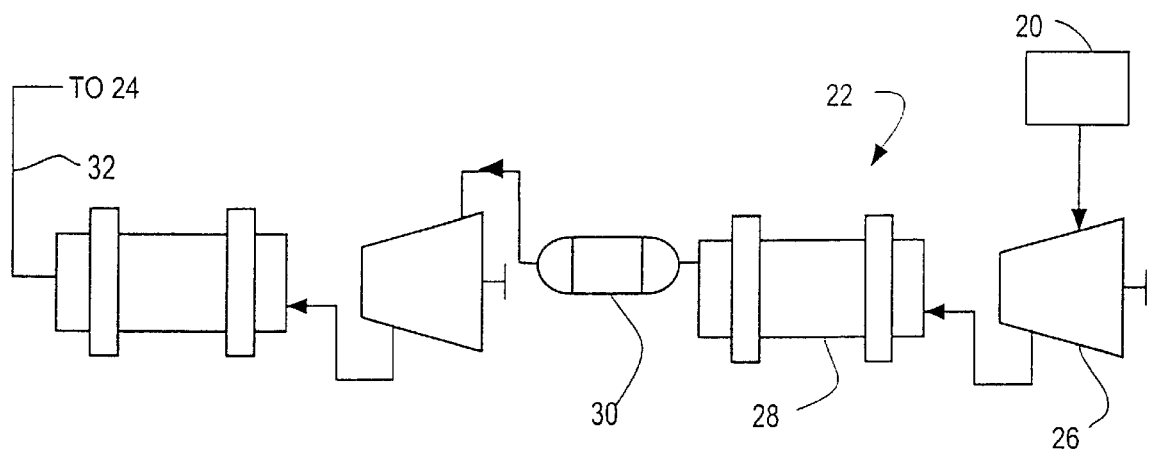
FIG. 1 is a schematic diagram of a compressor which is used with the dryer of the present invention.
Figure 2:
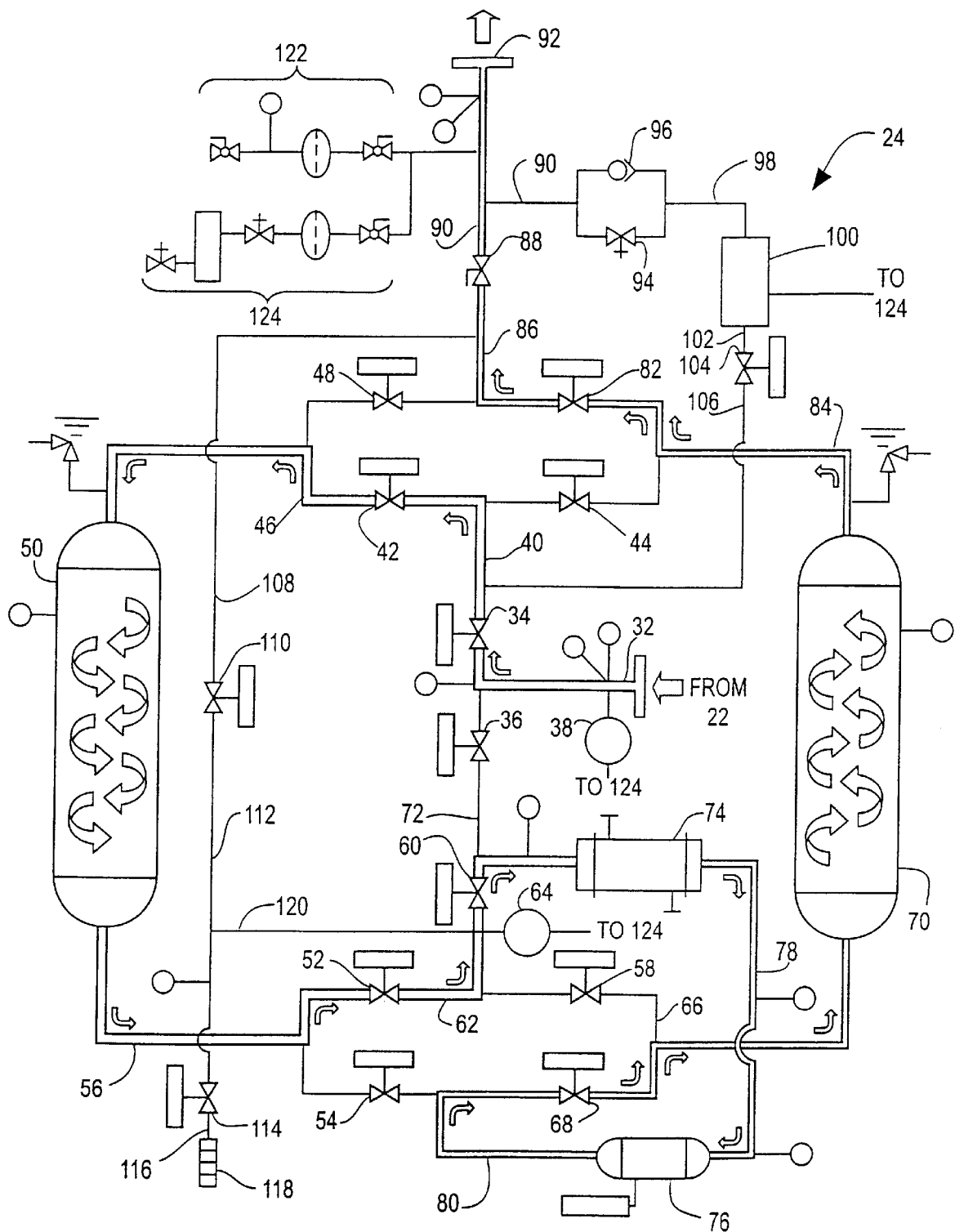
FIG. 2 is a schematic diagram of a novel dryer which incorporates the features of the invention.
Figure 3:
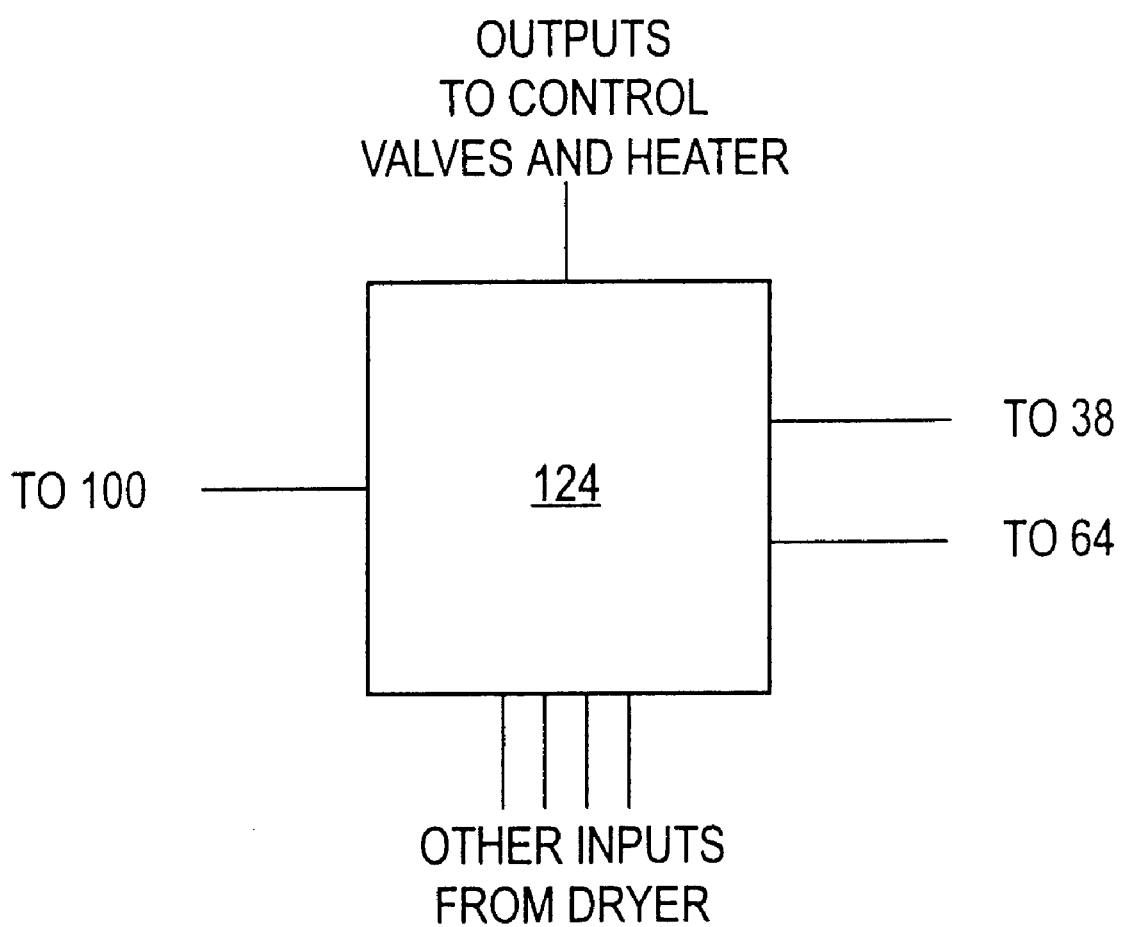
FIG. 3 is a schematic diagram of a novel programmable controller which is used with the dryer in the present invention.

While the invention may be susceptible to embodiment in different forms, there is shown in the drawings, and herein will be described in detail, a specific embodiment with the understanding that the present disclosure is to be considered an exemplification of the principles of the invention, and is not intended to limit the invention to that as illustrated and described herein.

The present invention provides a novel regenerative compressed dryer system for drying a gas, such as air. The system includes a compressor 22 and a dryer 24 which have been combined to enhance the performance of the dryer 24 versus prior art dryers.

The compressor 22 may be a multi-stage compressor. Each stage in the compressor 22 includes a compression stage 26, a heat exchanger 28 and a moisture separator 30 or other like separator. The inlet of the compressor 22 is connected to a source 20 of gas. The outlet of the compressor 22 is connected to the inlet of the dryer 24. The dryer 24 may also be located between the stages of the compressor 22, with all or part of the dryer 24 being operated between one or more stages of compression.

Line 32 connects the outlet of the compressor 22 to valve 34 and to valve 36. A temperature monitor 38, such as a thermostat, is connected to line 32. Line 40 connects valve 34 to valve 42 and to valve 44. Line 46 connects valve 42 to valve 48 and to one end of a tower 50, described in further detail herein.

The opposite end of the tower 50 is connected to valves 52, 54 by line 56. Valve 52 is connected to valves 58, 60 by line 62. A temperature monitor 64, such as a thermostat, is connected to line 62. Line 66 is connected to valve 68 and to one end of a tower 70, described in further detail herein.

Line 72 connects valve 60 to valve 36 and to one end of a heat exchanger 74. The other end of the heat exchanger 74 is connected to one end of a separator 76 by line 78. The opposite end of the separator 76 is connected by line 80 to valves 54 and 68.

The opposite end of the tower 70 is connected to valves 44, 82 by line 84. Line 86 connects valve 82 to valve 48 to valve 88.

Line 90 connects valve 88 to the outlet 92 of the dryer. Line 90 also connects valve 88 to valve 94 and to check valve 96. Line 98 connects valve 94 and check valve 96 to one end of a booster heater 100, the function of which is described herein. The booster heater 100 may be electric or steam. The other end of the booster heater 100 is connected to line 102. Line 102 is connected to valve 104. Valve 104 is connected to line 106 which is also connected to line 40.

Line 86 is also connected to line 108. Line 108 is connected to valve 110 which is connected to line 112. Line 112 is connected to valve 114 which is connected to line 116. Line 116 is connected to muffler 118 which exhausts gas to atmosphere. Line 120 is also connected to line 112 and to line 62.

Each tower 50, 70 has a desiccant material therein that is used to remove moisture from the gas as it passes therethrough. A pressure gauge and a pressure relief valve are connected to each tower 50, 70. After the desiccant material becomes saturated and cannot efficiently remove moisture from the gas, the desiccant material needs to be regenerated.

The lines as described herein are suitable for transporting high temperature gas therethrough. Temperature gauges, a thermostat, temperature switches, pressure gauges, and pressure switches are also provided to monitor the system and information is sent to a programmable controller 124. The flow of the gas through the system as described herein is controlled by using pilot gas bleed from line 90 by the structure shown at 122. Solenoids are used to activate the valves. In addition, a dew point monitor is provided by the structure shown at 124 to measure the moisture of the gas along line 90.

Measurements from the temperature gauges, thermostat, temperature switches, pressure gauges, and pressure switches are input into the programmable controller 124 which, in response, controls the opening and the closing of the valves after an analysis of the conditions in the dryer 24 is performed. Importantly, measurements from the temperature monitor 38, which monitors the temperature of the gas as it enters into the dryer 24, and measurements from the temperature monitor 64, which monitors the temperature of the gas as it exits the tower 50 or 70, are sent to the programmable controller 124. The temperature of the booster heater 100 is controlled by the programmable controller 124.

Now that the specifics of the system have been described, the operation of the system is described. The programmable controller 124, by using algorithms, determines in which mode the dryer 24 is to be placed depending on the temperature reading provided by temperature monitor 38 and by the temperature reading provided by temperature monitor 64. Most of the time, the dryer 24 will operate as a conventional heat of compression dryer.

When the dryer 24 is operating as a conventional heat of compression dryer, a complete cycle includes one tower being on line drying (removing moisture from the gas) while the other tower is being regenerated. Regeneration includes three separate modes; the heating mode, the stripping mode and the closed loop cooling mode.

The complete cycle is first described with tower 70 on line drying and tower 50 being regenerated.

In the heating mode, heated gas from the compressor 22 flows into the dryer 24 along line 32. A temperature measurement is taken by temperature monitor 38. Provided the temperature of the gas is high enough to provide adequate regeneration of the desiccant in the tower 50, the gas flows as described herein. Unless the valve is described as having gas flowing therethrough, it is to be understood that the valve is closed.

The gas flows along line 32, through valve 34, along line 40, through valve 42, along line 46 and into tower 50. As the heated gas from the compressor 22 flows through the tower 50, the desiccant is regenerated. The gas flows out the tower 50 along line 56, through valve 52 and along line 62. A temperature measurement is taken by temperature monitor 64 to monitor the temperature of the gas as it exits the tower 50. The gas flows through valve 60, along line 72 and into the heat exchanger 74.

The gas flows out of the heat exchanger 74, along line 78 and into the separator 76. The gas then flows out of the separator 76, along line 80, through valve 68 and into the tower 70.

The desiccant in the tower 70 dries the gas as it passes therethrough. The dried gas then flows along line 84, through valve 82, along line 86, through valve 88, along line 90 to the outlet 92 of the dryer 24.

Once the programmable controller 124 determines that the tower 50 has been sufficiently heated to regenerate the desiccant therein, the programmable controller 124 opens and closes the appropriate valves so that the stripping mode is performed. Again, unless the valve is described as having gas flowing therethrough, it is to be understood that the valve is closed.

In the stripping mode, any remnants of water in the desiccant in tower 50 are removed. The booster heater 100 can be energized by the programmable controller to increase the temperature of the gas used during stripping of tower 50.

The gas enters from the compressor into the dryer 24 along line 32. A temperature measurement is taken by temperature monitor 38 and the signal is sent to the programmable controller 124. The programmable controller determines if the booster heater 100 should be energized. The gas flows through valve 36, along line 72, and into the heat exchanger 74. The gas flows out of the heat exchanger 74, along line 78 and into the separator 76. The gas exits the separator 76 and flows along line 80, through valve 68, along line 66, and into the tower 70 where the gas is dried. The dried gas flows out of the tower 70 along line 84, through valve 82, along line 86 and to valve 88.

At this point in the cycle, valve 104 is opened thereby allowing a metered portion of gas, approximately 1% to 5%, to flow to the booster heater 100. Most of the gas, approximately 95% to 99% of the gas, flows along line 90 and exits the dryer 24 through the outlet 92.

The metered portion of the gas flows along line 90, through valve 94, along line 98 and into the booster heater 100 which is controlled by the programmable controller 124. The gas then flows out of the booster heater 100, along line 102, through valve 104, and along line 106 to line 40. The gas then flows through valve 42, along line 46 and into tower 50. The gas exits tower 50 and flows along line 56, through valve 52 and along line 62. As the gas flows through tower 50, any remnants of moisture are removed from the desiccant therein. A temperature measurement is taken by temperature monitor 64 to monitor the temperature of the gas as it exits the tower 50. The gas then flows along lines 120 and 112, through valve 114, along line 116 and exits to atmosphere through muffler 118.

The dryer 24, with sufficient regeneration temperature supplied from the compressed air, uses no energy and uses little or no compressed air for stripping (maximum of 5%, typically for 45 minutes out of every 4 hours or longer).

Once the programmable controller 124 determines that the tower 50 has been sufficiently heated to such that the stripping mode has been performed, the programmable controller 124 opens and closes the appropriate valves so that the closed loop cooling mode is performed. Again, unless the valve is described as having gas flowing therethrough, it is to be understood that the valve is closed.

In the closed loop cooling mode, no gas is lost to atmosphere and this mode ensures that the desiccant in regenerating tower 50 is in condition to go online and begin effectively drying the gas. If the desiccant in tower 50 is too hot, the desiccant cannot adsorb water from the gas. If water is not adsorbed by the desiccant, the dewpoint of the gas exiting the dryer 24 can be very high for an extended period of time. Additionally, the temperature of the gas exiting the dryer 24 can be hot and can pose potential personnel problems. Therefore, it is necessary to cool the desiccant in the tower 50 prior to shifting towers.

The gas enters from the compressor into the dryer 24 along line 32. A temperature measurement is taken by temperature monitor 38. The gas flows through valve 36, along line 72, and into the heat exchanger 74. The gas flows out of the heat exchanger 74, along line 78 and into the separator 76. The gas exits the separator 76 and flows along line 80, through valve 68, along line 66, and into the tower 70 where the gas is dried. The dried gas flows out of the tower 70 along line 84, through valve 82, along line 86 and to valve 88.

At this point in the closed loop cooling mode, valve 110 is opened allowing a metered portion of the gas, approximately 20% of the gas, to flow along line 108. Most of the gas, approximately 80% of the gas, flows through valve 88, along line 90 and exits the dryer 24 through the outlet 92.

The metered portion of the gas flows along line 108, through valve 110, and along lines 112, 120 and 62. A temperature measurement is taken by temperature monitor 64. The gas then flows through valve 52, along line 56 and into tower 50. As the gas passes through tower 50, the desiccant therein is cooled using this metered portion of the gas.

The gas then flows along line 46, through valve 42, along line 40, along line 106, through valve 104, along line 102 and into the de-energized booster heater 100. The gas flows outwardly from the booster heater 100 along line 98, flows through check valve 96, along line 90 to the outlet 92 of the dryer.

Once the programmable controller 124 determines that the tower 50 has been sufficiently cooled to such that the closed loop cooling mode has been performed, the programmable controller 124 opens and closes the appropriate valves so that the towers 50, 70 are shifted.

When shifted, tower 50 on line drying and tower 70 being regenerated. The complete cycle is now described with tower 50 on line drying and tower 70 being regenerated.

In the heating mode, heated gas from the compressor 22 flows into the dryer 24 along line 32. A temperature measurement is taken by temperature monitor 38. Provided the temperature of the gas is high enough to provide adequate regeneration of the desiccant in the tower 70, the gas flows as described herein. Again, unless the valve is described as having gas flowing therethrough, it is to be understood that the valve is closed.

The gas flows along line 32, through valve 34, along line 40, through valve 44, along line 84 and into the tower 70. As the heated gas from the compressor 22 flows through the tower 70, the desiccant is regenerated. The gas flows out the tower 70 along line 66, through valve 58, and along line 62. A temperature measurement is taken by temperature monitor 64 to monitor the temperature of the gas as it exits the tower 70. The gas then flows through valve 60, along line 72 and into the heat exchanger 74.

The gas flows out of the heat exchanger 74, along line 78 and into the separator 76. The gas then flows out of the separator 76, along line 80, through valve 54, along line 56, and into the tower 50.

The desiccant in the tower 50 dries the gas as it passes therethrough. The dried gas then flows along line 46, through valve 48, along line 86, through valve 88, along line 90 to the outlet 92 of the dryer 24.

Once the programmable controller 124 determines that the tower 70 has been sufficiently heated to regenerate the desiccant therein, the programmable controller 124 opens and closes the appropriate valves so that the stripping mode is performed. Again, unless the valve is described as having gas flowing therethrough, it is to be understood that the valve is closed.

In the stripping mode, any remnants of water in the desiccant in tower 70 is removed. The booster heater 100 can be energized by the programmable controller to increase the temperature of the gas used during stripping of tower 70.

The gas enters from the compressor into the dryer 24 along line 32. A temperature measurement is taken by temperature monitor 38 and the signal is sent to the programmable controller 124. The programmable controller determines if the booster heater 100 should be energized.

The gas flows through valve 36, along line 72, and into the heat exchanger 74. The gas flows out of the heat exchanger 74, along line 78 and into the separator 76. The gas exits the separator 76 and flows along line 80, through valve 54, along line 56, and into the tower 50 where the gas is dried. The dried gas flows out of the tower 50 along line 46, through valve 48, along line 86 and to valve 88.

At this point in the cycle, valve 104 is opened thereby allowing a metered portion of gas, approximately 1% to 5%, to flow into the booster heater 100. Most of the gas, approximately 95% to 99% of the gas, exits the dryer 24 through the outlet 92.

The metered portion of gas flows along line 90, through valve 94, along line 98 and into the booster heater 100 which is controlled by the programmable controller 124. The gas flows out of the booster heater 100, along line 102, through valve 104, along line 106 and along line 40. The gas then flows through valve 44, along line 84 and into tower 70. The gas exits tower 70 and flows along line 66, through valve 58 and along line 62. As the gas flows through tower 70, any remnants of moisture are removed from the desiccant therein. A temperature measurement is taken by temperature monitor 64 to monitor the temperature of the gas as it exits the tower 70. The gas then flows along lines 120 and 112, through valve 114, along line 116 and exits to atmosphere through muffler 118.

The dryer 24, with sufficient regeneration temperature supplied from the compressed air, uses no energy and uses little or no compressed air for stripping (maximum of 5%, typically for 45 minutes out of every 4 hours or longer).

Once the programmable controller 124 determines that the tower 70 has been sufficiently heated to such that the stripping mode has been performed, the programmable controller 124 opens and closes the appropriate valves so that the closed loop cooling mode is performed. Again, unless the valve is described as having gas flowing therethrough, it is to be understood that the valve is closed.

In the closed loop cooling mode, no gas is lost to atmosphere and this mode ensures that the desiccant in regenerating tower 70 is in condition to go online and begin effectively drying the gas. If the desiccant in tower 70 is too hot, the desiccant cannot adsorb water from the gas. If water is not adsorbed by the desiccant, the dewpoint of the gas exiting the dryer 24 can be very high for an extended period of time. Additionally, the temperature of the gas exiting the dryer 24 can be hot and can pose potential personnel problems. Therefore, it is necessary to cool the desiccant in the tower 70 prior to again shifting towers.

The gas enters from the compressor into the dryer 24 along line 32. A temperature measurement is taken by the temperature monitor 38. The gas then flows through valve 36, along line 72, and into the heat exchanger 74. The gas flows out of the heat exchanger 74, along line 78 and into the separator 76. The gas exits the separator 76 and flows along line 80, through valve 54, along line 56, and into the tower 50 where the gas is dried. The dried gas flows out of the tower 50 along line 46, through valve 48, along line 86 and to valve 88.

At this point in the closed loop cooling mode, valve 110 is opened allowing a metered portion of the gas, approximately 20% of the gas, to flow along line 108. Most of the gas, approximately 80% of the gas, flows through valve 88, along line 90 and exits the dryer 24 through the outlet 92.

The metered portion of the gas flows along line 108, through valve 110, along lines 112, 120. A temperature measurement is taken by temperature monitor 64. The gas then flows along line 62, through valve 58, along line 66 and into tower 70. As the gas passes through tower 70, the desiccant therein is cooled using this metered portion of the gas.

The gas then flows along line 84, through valve 44, along line 40, along line 106, through valve 104, along line 102 and into the de-energized booster heater 100. The gas flows outwardly from the booster heater 100 along line 98, through check valve 96, along line 90 to the outlet 92 of the dryer.

Once the programmable controller 124 determines that the tower 70 has been sufficiently cooled to such that the closed loop cooling mode has been performed, the programmable controller 124 opens and closes the appropriate valves so that the towers 50, 70 are again shifted.

The temperature monitors 38, 64 are used to optimize the regeneration mode. By monitoring the inlet regeneration temperature by using temperature monitor 38 and by monitoring the temperature exiting the regenerating tower by using temperature monitor 64, the programmable controller 124 can adjust the regeneration time. If the inlet regeneration temperature is low, then in the stripping mode, the booster heater 100 (about 9 KW per 1,000 scfm of dryer size) operates for approximately 45 minutes and 7% compressed air consumption for about 90 minutes out of every 4 hours or longer.

As can be seen from the description herein, during the heating mode of regeneration, the gas flows through the towers 50, 70 in opposite directions. Lines 46, 56, 66, 84 can be connected to the towers 50, 70 such that the gas flows through the towers 50, 70 in the same direction.

In a situation where the temperature of the gas at the inlet of the dryer 24 is extremely low, for example, under 125° F., the programmable controller 124 can be programmed to select a different timing program and to operate in a "heatless" mode to ensure adequate regeneration of the desiccant in the tower that is being regenerated. The programmable controller 124 opens and closes the appropriate valves to enter into this mode. The situation can arise at original start-up of a plant or commissioning of a new plant with initially low air usage. In addition, this situation may arise when the normal compressor is taken out of service and rental, portable compressors with built-in aftercoolers are employed. These rental compressors often times do not generate a gas flow which has high enough heat to effect regeneration of the desiccant. Another possible situation arises when a new compressor is used. New compressors are very efficient and generate very low discharge temperatures. The "heatless" mode provides an operator with the comfort of a "belt and suspenders". Alternatively, the "heatless" mode of operation can be an option that may be selected by the customer by pressing a button on the touch screen.

In the "heatless" mode and where tower 50 is being regenerated and tower 70 is being used to remove moisture from the gas, gas enters from the compressor into the dryer 24 along line 32. A temperature measurement is taken by temperature monitor 38. Again, unless the valve is described as having gas flowing therethrough, it is to be understood that the valve is closed.

The gas flows along line 32, through valve 36, along line 72, and into the heat exchanger 74. The gas flows out of the heat exchanger 74, along line 78 and into the separator 76. The gas exits the separator 76 and flows along line 80, through valve 68, along line 66, and into the tower 70 where the gas is dried. The gas flows out of the tower 70 along line 84, through valve 82, along line 86 and through valve 88.

After the gas flows through valve 88 most of the dried gas, approximately 85% of the dried gas, flows along line 90 and exits the dryer 24 through the outlet 92. At this point in the mode, valve 104 is opened allowing a metered portion of the gas, approximately 15% of the dried gas, to pass through valve 94 and into the de-energized booster heater 100.

The gas exits the booster heater 100 and flows along line 102 and through valve 104. The gas then flows along line 106, along line 40, through valve 42, along line 46 and into tower 50. The gas then exits tower 50, flows along line 56, through valve 52 and along line 62. A temperature measurement is taken by temperature monitor 64. The gas then flows along line 120 and along line 112. The gas is exhausted to atmosphere at muffler 118 through valve 114 and along line 116.

Because the purge rate is high, approximately 15% of the gas is purged to atmosphere, and because the "heatless" mode is only run for a short period of time, this is sufficient to regenerate tower 50.

In the "heatless" mode and where tower 70 is being regenerated and tower 50 is being used to remove moisture from the gas, gas enters from the compressor into the dryer 24 along line 32. A temperature measurement is taken by temperature monitor 38. Again, unless the valve is described as having gas flowing therethrough, it is to be understood that the valve is closed.

The gas flows along line 32, through valve 36, along line 72, and into the heat exchanger 74. The gas flows out of the heat exchanger 74, along line 78 and into the separator 76. The gas exits the separator 76 and flows along line 80, through valve 54, along line 56, and into the tower 50 where the gas is dried. The dried gas flows out of the tower 50 along line 46, through valve 48, along line 86 and through valve 88.

After the gas flows through valve 88 most of the dried gas, approximately 85% of the dried gas, flows along line 90 and exits the dryer 24 through the outlet 92. At this point in the mode, valve 104 is opened allowing a metered portion of the gas, approximately 15% of the dried gas, to pass through valve 94 and into the de-energized booster heater 100.

The gas exits the booster heater 100 and flows along line 102 and through valve 104. The gas then flows along line 106, along line 40, through valve 44, along line 84 and into tower 70. The gas then exits tower 70, flows along line 66, through valve 58 and along line 62. A temperature measurement is taken by temperature monitor 64. The gas then flows along line 120 and along line 112. The gas is exhausted to atmosphere at muffler 118 through valve 114 and along line 116.

Because the purge rate is high, approximately 15% of the gas is purged to atmosphere, and because the "heatless" mode is only run for a short period of time, this is sufficient to regenerate tower 70.

The temperature monitors 38, 64 are used to optimize the stripping mode and the "heatless" mode. By monitoring the inlet regeneration temperature by using temperature monitor 38 and by monitoring the temperature exiting the regenerating tower by using temperature monitor 64, the programmable controller 124 can adjust the regeneration time.

The use of the booster heater 100, the temperature monitors 38, 64 and the programmable controller 124 automates the total integration of the dryer controls. The programmable controller 124 of the present invention uses multiple algorithms to automatically select the optimum operation mode. The programmable controller 124 has a touch sensitive display screen (not shown) mounted on the dryer control box for ease in user operation.

The heat of compression dryer 24 of the present invention provides performance under virtually any operating condition. The inlet temperature from the compressor 22 limits a conventional heat of compression dryer.

Most of the time, the heat of compression dryer 24 of the present invention will operate in the same manner as a prior art heat of compression dryer. If the inlet temperature drops too low, however, the prior art heat of compression dryer will not deliver gas having the necessary dewpoint. By using the improvements provided by the present invention, the temperature monitors 38, 64, the booster heater 100 and the programmable controller 124, the dryer 24 of the present invention delivers optimum performance under any set of conditions. Additionally, the "heatless" mode allows the dryer 24 to perform even if the inlet temperature is from a portable compressor or other source of very low temperature air.

While a preferred embodiment of the present invention is shown and described, it is envisioned that those skilled in the art may devise various modifications of the present invention without departing from the spirit and scope of the appended claims.

The invention claimed is:

1. A system for drying a gas comprising:
   a source of gas;
   a compressor connected to said source; and
   a dryer connected to said compressor, said dryer comprising a first tower and a second tower, each said tower containing desiccant material past which said gas flows, a dryer outlet, an exhaust outlet, and communication structure being capable of placing the system in each of the following modes at different times:
   A) connecting said first tower to said compressor, connecting said first tower to said second tower, and connecting said second tower to said dryer outlet, such that said desiccant in said first tower is regenerated when said gas flows through said first tower and such that gas is dried when said gas flows through said second tower;
   B) connecting said second tower to said compressor, connecting said second tower to said first tower, and connecting said first tower to said dryer outlet, such that said desiccant in said second tower is regenerated when said gas flows through said second tower and such that gas is dried when said gas flows through said first tower;
   C) connecting said first tower to said compressor and to said dryer outlet such that said gas is dried when said gas flows through said first tower, and connecting said second tower downstream of said first tower and to said exhaust outlet, such that a portion of said dried gas flows through said second tower to said exhaust outlet, said desiccant in said second tower being regenerated as said gas passes therethrough; and
   D) connecting said second tower to said compressor and to said dryer outlet such that said gas is dried when said gas flows through said second tower, and connecting said first tower downstream of said second tower and to said exhaust outlet, such that a portion of said dried gas flows through said first tower to said exhaust outlet, said desiccant in said first tower being regenerated as said gas passes therethrough.

2. A system as defined in claim 1, wherein said communication structure is controlled by a controller.

3. A system as defined in claim 2, wherein said controller is programmable.

4. A system as defined in claim 1, wherein said communication structure includes a valve for diverting said portion of said gas to said respective tower during modes C) and D).

5. A system as defined in claim 1, wherein each said portion of said dried gas is approximately 15% of the total dried gas.

6. A system as defined in claim 1, wherein said dryer further includes a heater, and
   wherein in mode C), said heater is connected downstream of said first tower and upstream of said second tower, such that said gas flows through said heater and is heated to a predetermined temperature prior to flowing through said second tower, and
   wherein in mode D), said heater is connected downstream of said second tower and upstream of said first tower, such that said gas flows through said heater and is heated to a predetermined temperature prior to flowing through said first tower.

7. A system as defined in claim 6, wherein each said portion of said dried gas is approximately 1% to 5% of the total dried gas.

8. A system as defined in claim 6, wherein said heater is controlled by a controller.

9. A system as defined in claim 1, further including a first temperature reading means for monitoring the temperature of said gas as said gas enters said dryer, a second temperature reading means for monitoring the temperature of said gas as said gas exits said tower which is being regenerated, and control means for receiving information from said first and second temperature reading means and controlling said valves in response thereto to place said system in one of said modes.

10. A system as defined in claim 1, wherein said communication structure is further capable of placing the system in the following modes at different times than said modes A) through D):
    E) connecting said first tower to said compressor and to said dryer outlet such that said gas is dried when said gas flows through said first tower, and connecting said second tower downstream of said first tower and to said dryer outlet such that a portion of said dried gas flows through said second tower and to said dryer outlet; and
    F) connecting said second tower to said compressor and to said dryer outlet such that said gas is dried when said gas flows through said second tower, and connecting said first tower downstream of said second tower and to said dryer outlet such that a portion of said dried gas flows through said first tower and to said dryer outlet.

11. A system as defined in claim 10, further including a valve for diverting said portion of said gas to said respective tower during modes C) through F).

12. A system as defined in claim 1, wherein said communication structure includes at least one valve.

13. A system as defined in claim 12, wherein said at least one valve is controlled by a controller.

* * * * *